Figure 1:
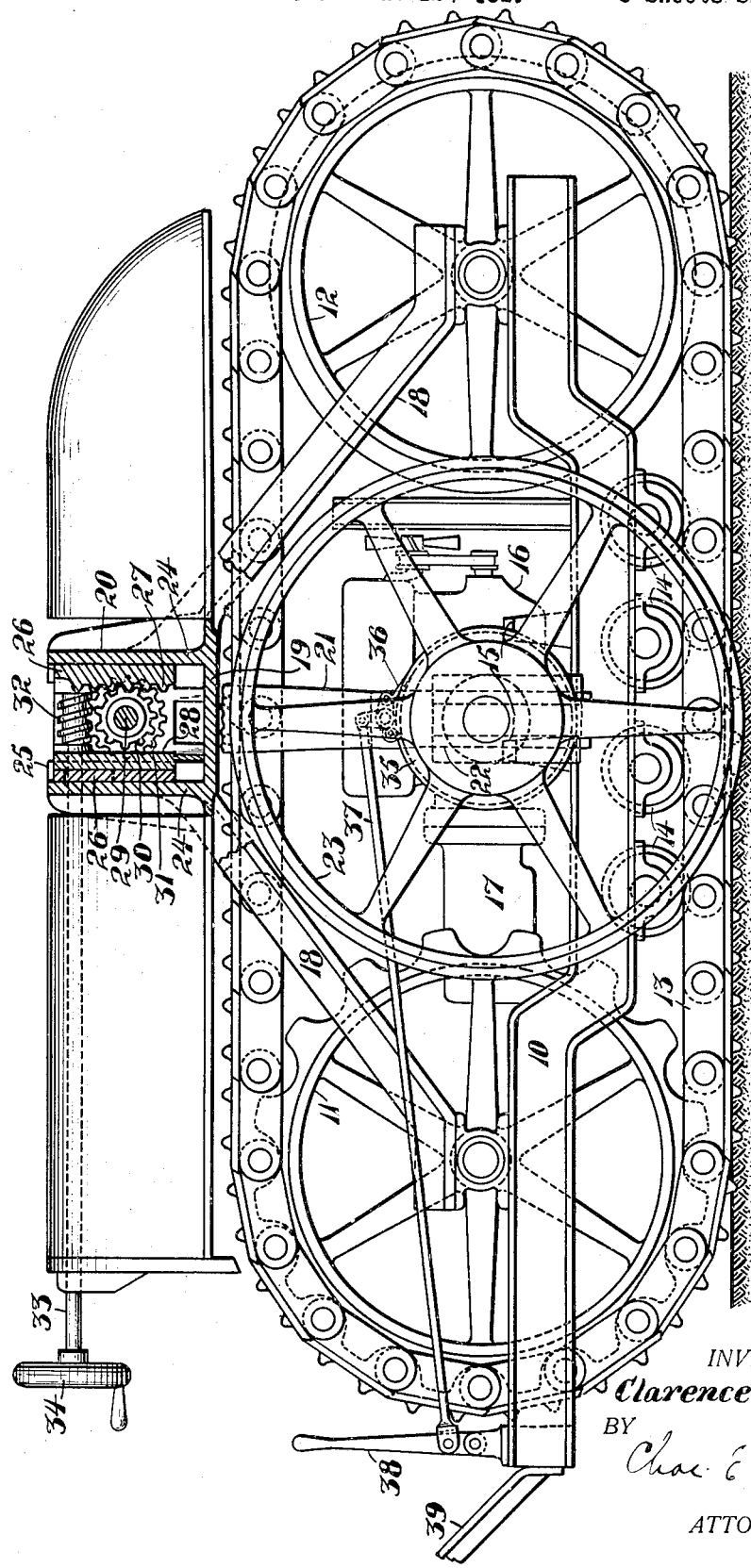

Aug. 5, 1924.

C. L. BEST

TRACTOR 1,503,628

Filed Jan. 12, 1921    3 Sheets-Sheet 1

INVENTOR
Clarence L. Best
BY
Chas. E. Townsend
ATTORNEY

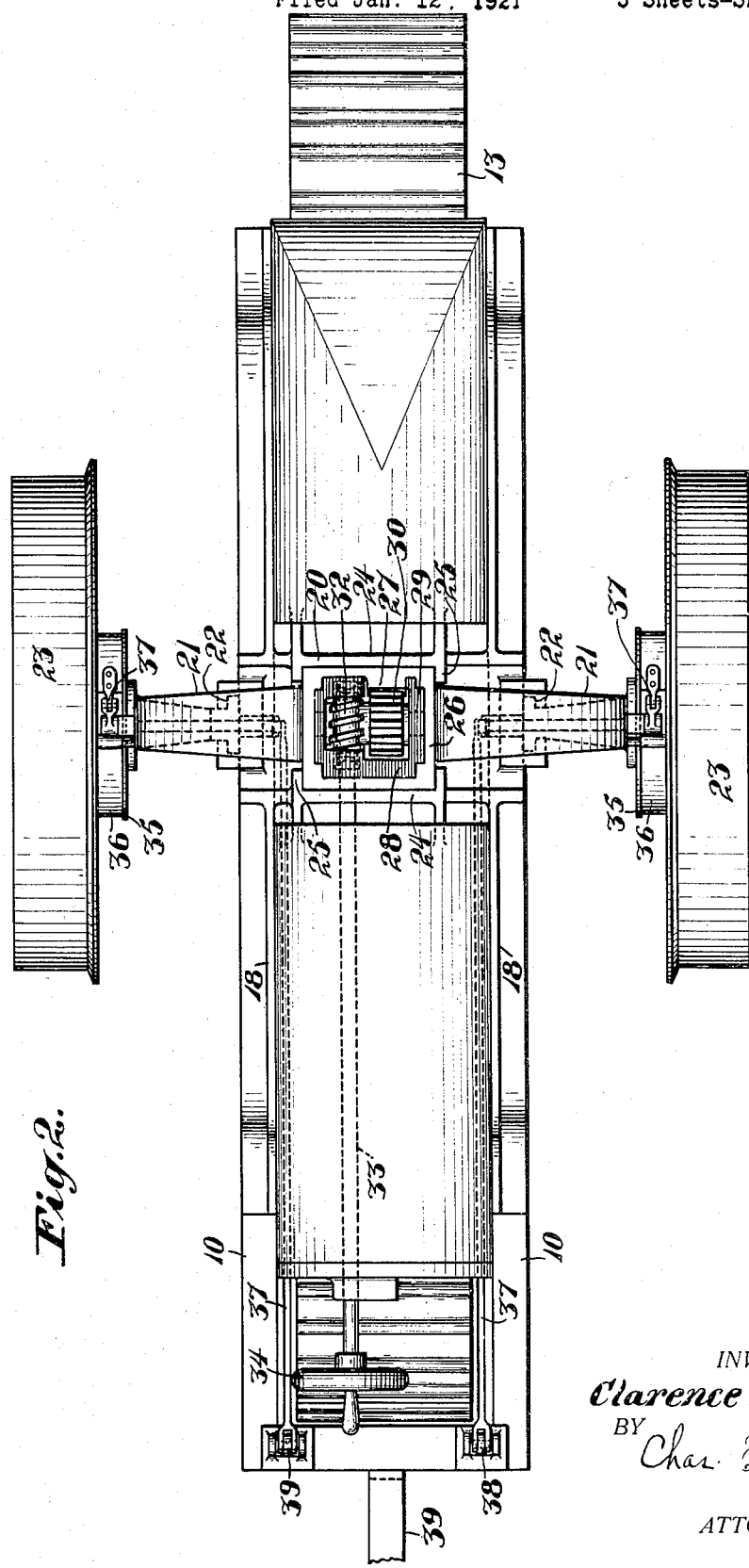

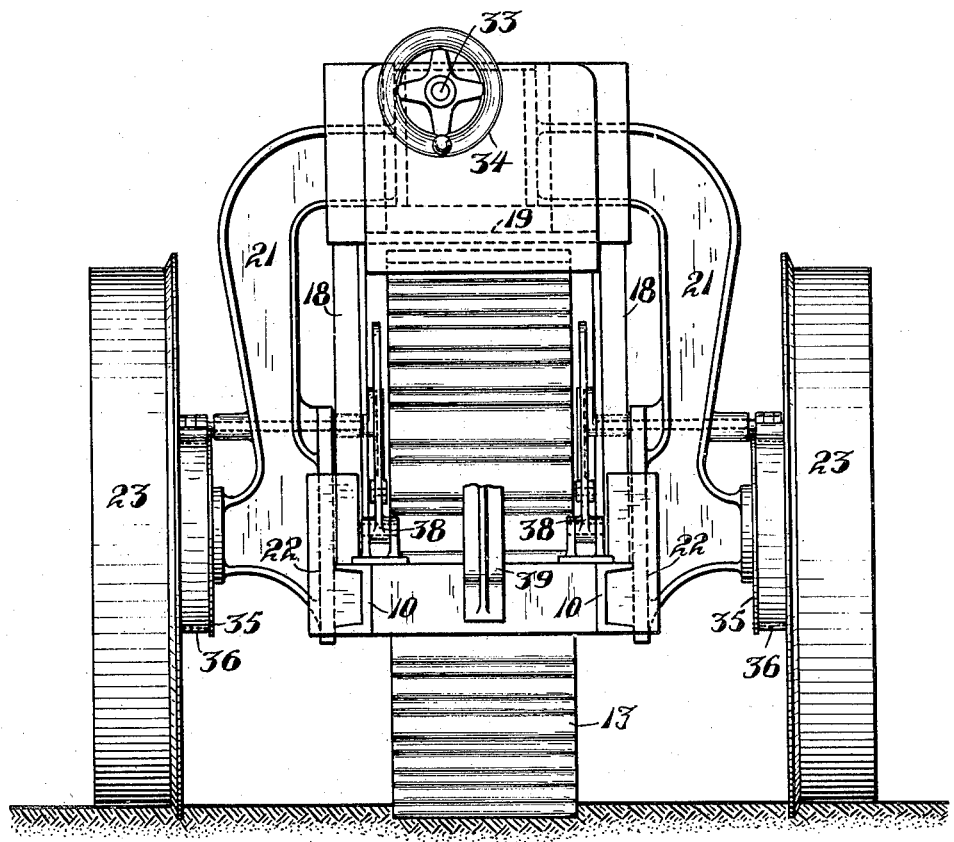

Patented Aug. 5, 1924.

1,503,628

UNITED STATES PATENT OFFICE.

CLARENCE LEO BEST, OF SAN LEANDRO, CALIFORNIA, ASSIGNOR TO THE HOLT MANUFACTURING COMPANY, OF STOCKTON, CALIFORNIA, A CORPORATION OF CALIFORNIA.

TRACTOR.

Application filed January 12, 1921. Serial No. 436,642.

*To all whom it may concern:*

Be it known that I, CLARENCE LEO BEST, a citizen of the United States, residing at San Leandro, in the county of Alameda and State of California, have invented new and useful Improvements in Tractors, of which the following is a specification.

This invention relates to tractors having a single traction and supporting unit. The object is to steer and stabilize or balance this single track unit in a novel and improved manner. In carrying out this object I employ a single centrally arranged traction and supporting unit preferably of the self-laying track type, extending across which is a yoke, each end of which yoke carries a ground engaging wheel to assist in stabilizing and balancing the tractor. These wheels are not designed to carry any considerable amount of weight and the yoke is made adjustable vertically so as to regulate the degree of pressure of its wheels upon the ground. Each wheel is fitted with a brake mechanism controllable independently from the seat whereby to steer the tractor.

One form which my invention may assume is exemplified in the following description and illustrated in the accompanying drawings, of which—

Fig. 1 shows a side elevation partly in section of a tractor embodying my invention, Fig. 2 shows a plan view of the same, Fig. 3 shows a rear elevation of the same tractor shown in Figs. 1 and 2.

The main frame of the tractor comprises parallel side bars 10 between which at the rear is journalled a driving sprocket wheel 11 and at the front is an idler sprocket wheel 12. Over these sprocket wheels is an endless chain track 13. The side bars are shown as bent downwardly intermediate the sprocket wheels, and on their under side they carry supporting rollers 14 operating on the ground stretch of the track. Transverse sills 15 rest upon the frame bars intermediate the sprocket wheels and serve to support a motor 16 and transmission mechanism 17.

Struts 18 extend up at each side of the tractor from the journal boxes of the sprocket wheels and have a connecting web 19 at their upper ends extending across the top of the tractor. This connecting web forms a support for a guide 20 to receive a yoke 21 which yoke extends across the top of the tractor and has its ends extending downwardly at each side thereof and working in dovetail slots or channels 22 at each side of the main frame. A spindle is formed on each end of the yoke and a ground engaging wheel 23 is journalled on each spindle.

The guide 20 is formed by means of a pair of transversely extending upstanding plates 24 having flanges 25 at each end and between which a rectangular sliding bearing 26, formed upon the yoke, fits. Inside the sliding bearing is formed with a toothed rack 27, and a block 28 on the connecting web 19 projects upwardly within the sliding bearing 26. This block carries a shaft 29 on which is fitted a spur gear 30 to mesh with the toothed rack 27 and a worm gear 31 to mesh with a screw 32 fixed upon the end of a shaft 33 which extends rearwardly longitudinally of the tractor and carries a hand wheel 34 at its rear end. This shaft is journalled at its forward end in one of the vertical plates 24 and also in the block 28, passing through a slot in the wall of the sliding bearing 26. Turning of the shaft 33 causes the yoke to be raised or lowered for the purpose of regulating the pressure of the wheels 23 upon the ground.

Each wheel carries a brake-drum 35 on which is a band 36 having operating connections 37 extending to a lever 38 at the rear of the tractor frame. A seat 39 is also provided at the rear of the tractor frame in close proximity to the brake levers 38 and hand wheel 34.

In the operation of the tractor the pressure of the wheels 23 on the ground is sufficient to cause the track laying unit to be swung around in the desired direction. This is accomplished by setting the brake on that wheel towards the side which it is desired to turn and releasing the brake on the opposite wheel. The vertically adjustable yoke permits the wheels 23 to be raised and lowered so as to regulate their height and prevent any possibility of their sustaining any considerable part of the load when, for any reason, the track laying unit is operating in a depression or furrow.

Such a tractor as is shown and described herein is very inexpensive to construct and has the advantage of being extremely small and compact. It is well suited for orchard work and other situations where a low narrow tractor is required.

Various changes in the construction and arrangement of the several parts herein shown and described may be employed without departing from the spirit of my invention as disclosed in the appended claims.

Having thus described my invention, what I claim and desire to secure by Letters Patent is—

1. A tractor formed of a single centrally arranged endless flexible traction and supporting unit, a yoke extending transversely of the tractor across the top of the traction unit, a wheel at each end of the yoke to engage the ground for steering and stabilizing the tractor and means for raising and lowering the yoke to vary the pressure of its wheels upon the ground.

2. A tractor comprising a single centrally arranged track laying unit formed of front and rear sprocket wheels, an endless chain track carried by said sprocket wheels, parallel side bars between which the sprocket wheels are journalled, supporting rollers journalled between the side bars intermediate the sprocket wheels and operating on the ground stretch of the track, a motor and transmission mechanism supported on the side bars between the front and rear sprocket wheels, struts carried on the journal boxes of each sprocket wheel extending upwardly at each side of the tractor and connected across the top of the track, a guide carried by said struts, a yoke slidable vertically in said guide and having its end extending downwardly at each side of the tractor and a ground engaging wheel journalled on each end of the yoke for the purpose specified.

3. In a track laying tractor, a single track laying device including a frame, a driving sprocket at one end of the frame, an idler wheel at the other end of the frame and a tread engaged with the driving sprocket and idler wheel, wheel carrying frames located at opposite sides of the track laying device and connected thereto to slide vertically thereon, a rack gear on said frames, a pinion meshing with the rack, and manual operating means for rotating the pinion and locking the frames in adjusted position.

4. In a track laying tractor, a single track laying device including a frame, a driving sprocket at one end of the frame, an idler wheel at the other end of the frame and a tread engaged with the driving sprocket and idler wheel, wheel carrying frames located at opposite sides of the track laying device and connected thereto to slide vertically thereon, a rack gear on said frames, a pinion meshing with the rack, and a manually operable worm gear connection with said pinion.

5. In a track laying tractor, a single track laying device including a frame, a driving sprocket at one end of the frame, an idler wheel at the other end of the frame, and a tread engaged with the driving sprocket and idler wheel, a guide supported on the frame above the track laying device, wheel carrying frames at opposite sides of the track laying device having a vertical sliding connection at their lower portions with the frame of the track laying device, said frames having arched upper portions extending inwardly over the track laying device and slidably engaging said guide, and means for adjusting the frames.

6. In a track laying tractor, a single track laying device including a frame, a driving sprocket at one end of the frame, an idler wheel at the other end of the frame, and a tread engaged with the driving sprocket and idler wheel, struts extending upwardly from the frame of the track laying device at opposite sides thereof and above the same, a tubular guide supported by said struts, wheel carrying frames at opposite sides of the track laying device having a vertical sliding connection at their lower portions with the frame of the track laying device, said frames at their upper ends extending inwardly over the track laying device and slidably fitting within the tubular guide, a rack on said frames disposed at opposite sides of the guide, a pinion supported for rotation within the guide between the rack and meshing therewith, and manually operable means for rotating the pinion.

CLARENCE LEO BEST.